United States Patent Office 3,615,111
Patented Oct. 26, 1971

3,615,111
METHOD OF ASSEMBLING TWO TUBULAR MEMBERS IN ENCASTRÉ RELATIONSHIP
Albert Grosseau, Chaville, France, assignor to Societe Anonyme Automobiles Citroen, Paris, France
Filed Oct. 16, 1969, Ser. No. 866,893
Claims priority, application France, Oct. 25, 1968, 3,572
Int. Cl. F16b 3/00
U.S. Cl. 287—189.36 R                                8 Claims

ABSTRACT OF THE DISCLOSURE

An assembly of two tubular members in encastré relationship includes a first tubular member formed by two semi-shells one of which has a flared aperture for the receipt of a second tubular member. That end of the second tubular member which lies within the first is secured to a sheet member or partition, edges of which are secured to flanges forming parts of the semi-shells. On either side of this partition two further partitions are disposed laterally which are secured to the internal surface of both semi-shells and to end flanges of the first mentioned partition member.

The method of assembly includes inserting the second tubular member into the flared aperture of one of the semi-shells welding the inserted end into the first mentioned partition and subsequently welding the partition to the flanges of the semi-shells and welding the laterally disposed partitions to the first mentioned partition and to the interior surfaces of the semi-shells.

BACKGROUND OF THE INVENTION

Field of the invention

This invention relates to a method for the assembly of automobile chassis and to chassis manufactured by the method.

The road holding of an automobile vehicle is substantially affected by the rigidity of its chassis. It is therefore of importance to assemble the members of the latter in such a manner that it is equivalent to a true rigid framework.

SUMMARY OF THE INVENTION

According to the present invention there is provided a method for the assembly of two tubular members in which one of the tubular members is formed from two semi-shells capable of being secured to one another, the other member being engaged in the first member and secured to the latter, said method comprising the steps of introducing the second tubular member into one of the two semi-shells, securing a partition member disposed within this semi-shell to the second tubular member on the axis of the first member, securing said partition to the said semi-shell and also to two lateral partitions disposed within the said semi-shell, and finally securing the other semi-shell on the first semi-shell as well as to the lateral partitions and also to the fisrt-mentioned partition.

BRIEF DESCRIPTION OF THE DRAWINGS

There is described hereafter, by way of non-limiting example, an embodiment of an assembly in accordance with the invention with reference to the accompanying drawing in which.

Figure 1:
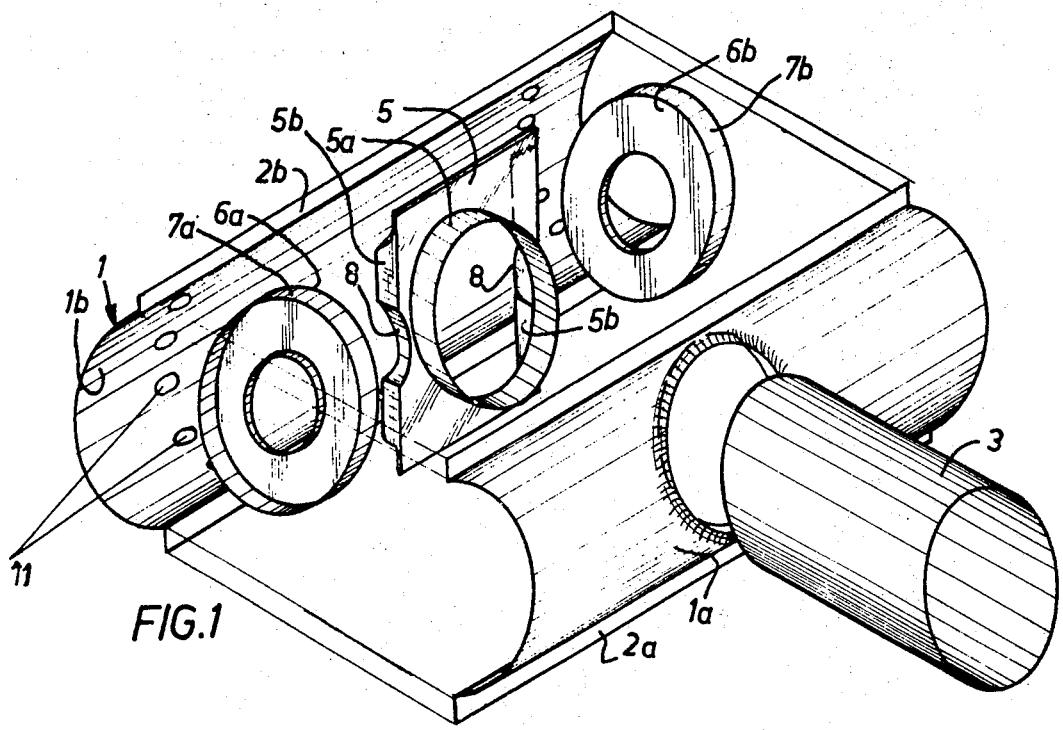
FIG. 1 is a perspective exploded view of various members of the assembly.
Figure 2:
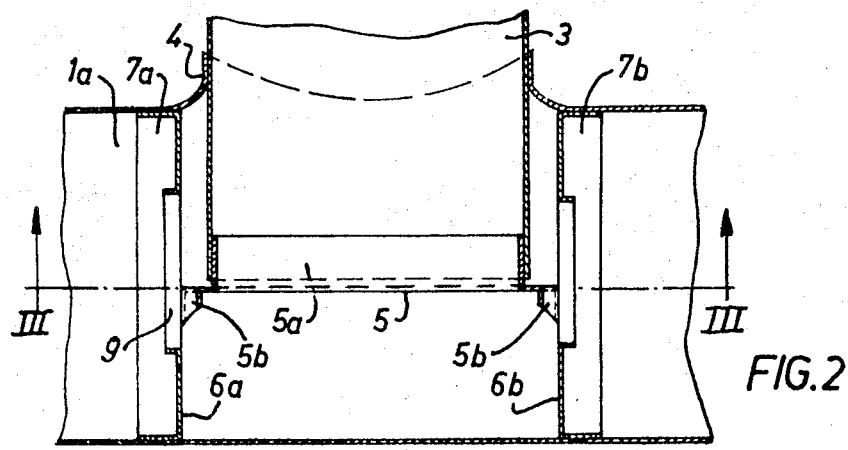
FIG. 2 is a plan view of the assembly.
Figure 3:
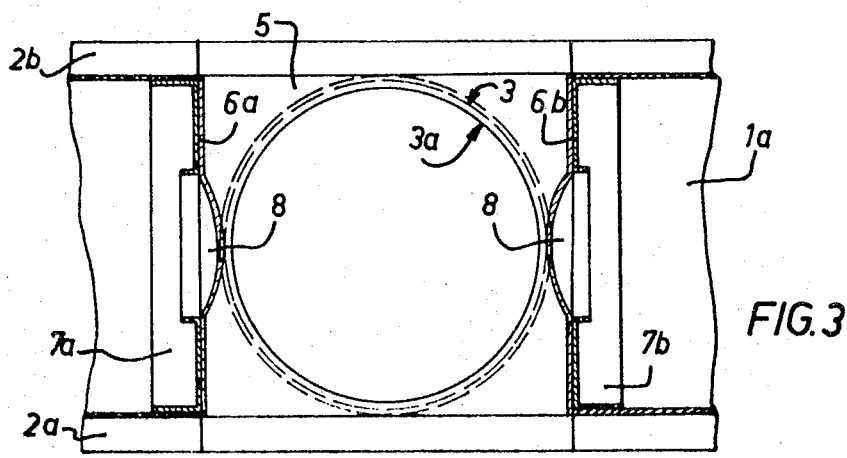
FIG. 3 is a section on the line III—III of FIG. 2.

In the drawing, there is seen at 1 a longeron or other longitudinal member which is formed by two stamped or pressed semi-shells 1a and 1b and in the example shown has a circular section; each semi-shell has two external ribs or flanges 2a and 2b through the intermediary of which they are welded to one another. A transverse member 3 is secured to this longeron which likewise, in this embodiment, has a circular section and lies substantially perpendicular to the longeron 1. This transverse member 3 enters the semi-shell 1a, to which it is welded, at an outwardly flared portion 4 as indicated in FIG. 2. In a modification, a bush or sleeve is appropriately welded simultaneously to the longeron 1 and to the transverse member 3.

The end of the transverse member 3 lying within the longeron is substantially in abutment with a sheet metal member 5 which lies in the diametral plane of the joint of the two semi-shells 1a and 1b and of which the two opposed edges are welded between the flanges 2a and 2b of these semi-shells. The sheet member 5 comprises a collar 5a which projects from the plane of the sheet, is engaged in the transverse member 3 and welded thereto.

The two other edges of the sheet member 5 carry folded-over parts 5b which are welded to two laterally-disposed discs 6b and 6a disposed within the longeron 1, perpendicular to the longitudinal axis of the latter on the one and the other side of the transverse member 3.

Each of these two discs 6a, 6b comprises respectively an annular flange 7a and 7b respectively which is welded over its whole periphery on the internal surface of the longeron 1.

The sheet member 5 may be solid or apertured. It may be provided with lateral recesses or notches 8 facing the respective disc 6a, 6b; these discs may themselves be centrally apertured, as indicated at 9, in order on the one hand to lighten the assembly without prejudicing its rigidity, and on the other hand to maintain communication between the two portions of the longeron lying between the one and the other part of the transverse member 3 and thus allowing the passage or removal of liquid solutions used to effect an anti-corrosive protection or to carry out treatment of the surface.

In order to produce the assembly which has just been described, the two discs 6a and 6b are located within the semi-shell 1a and are secured thereto. The transverse member 3 is engaged in the flared aperture 4 of the semi-shell 1a whilst moving it towards the interior of the latter to beyond tis normal position and the sheet member 5 is then secured on this transverse member. Then the transverse member 3 is retracted together with the front sheet until the edge portions thereof abut against the flanges 2a and 2b of the semi-shell 1a, and the sheet member 5 is secured to these flanges, as well as to the discs 6a and 6b. Finally, the assembly is mated with the semi-shell 1b, of which the flanges are secured to the corresponding flanges of the semi-shell 1a and to the auxiliary flanges 7a and 7b of the discs 6a and 6b, for example by welding through orifices 11 of the semi-shell 1b.

The various securing points are preferably effected by spot-welding.

The assembly thus formed is extremly rigid, the various internal partitions, 5, 6a and 6b effecting a true encastré securing the transverse member 3 and of the longeron 1, with respect to one another. In effect, the lateral discs make the two shells 1a and 1b rigid transversely in a direction favourable to loading in torsion, which prevents or reduces deformation arising generally at right angles to the bends and to the weld fillets. Moreover, the sheet member 5 braces the assembly and because of its connection to the lateral discs 6a and 6b, directly transmits the shear force whilst dividing it advantageously between the various members of the assembly. Experience shows that the actual deformations differ only very slightly from those calculated on the assumption that the transverse member and the longeron are rigidly secured one to the other in encastré relationship.

I claim:

1. An assembly of two tubular members with the members in encastré relationship, said assembly comprising:
   two semi-shells forming one said tubular member, one said semi-shell having an aperture receiving the other tubular member,
   a partition member disposed within the first member and secured both to one end of the second tubular member and to the semi-shells, and
   two partition members disposed laterally of the first mentioned partition member and secured thereto.

2. An assembly according to claim 1, wherein each of the laterally-disposed partitions comprises an annular flange secured over its whole periphery to the first member.

3. An assembly according to claim 1, wherein each of the two laterally-disposed partition members is apertured at its centre.

4. An assembly according to claim 1, wherein the first-mentioned partition member includes:
   a small annular collar in engagement with the second tubular member.

5. An assembly according to claim 1, wherein the first-mentioned partition member includes: flanges by which it is secured to the laterally-disposed partition members.

6. An assembly according to claim 5, wherein the first-mentioned partition member has lateral recesses at right angles to the plane of its surface.

7. An assembly according to claim 1 comprising an annular flange surrounding the aperture of said one semi-shell, said flange receiving the second tubular member.

8. In an automoible chassis, at least one assembly as defined in claim 1.

References Cited

UNITED STATES PATENTS

| | | | |
|---|---|---|---|
| 1,630,492 | 5/1927 | Kusterle | 287—189.36 B UX |
| 1,846,567 | 2/1932 | Murray | 287—189.36 |
| 1,992,710 | 5/1935 | Matthaei | 287—189.36 |
| 2,113,403 | 4/1938 | Harmon | 287—189.36 B X |
| 2,128,720 | 8/1938 | Tweedale | 285—424 X |
| 2,179,089 | 11/1939 | Haut | 285—286 X |
| 3,088,750 | 5/1963 | Schilberg | 287—189.36 B X |
| 3,485,006 | 12/1969 | De Rozario | 287—56 X |

DAVID J. WILLIAMOWSKY, Primary Examiner

W. L. SHEDD, Assistant Examiner

U.S. Cl. X.R.

287—56